United States Patent [19]
Beckhaus et al.

[11] Patent Number: 6,156,288
[45] Date of Patent: Dec. 5, 2000

[54] PROCESS FOR PURIFYING AND CONCENTRATING SPENT SULFURIC ACIDS

[75] Inventors: Heiko Beckhaus, Leverkusen; Jürgen Münnig, Kaarst; Dieter Grenner, Leverkusen, all of Germany

[73] Assignee: Bayer Aktiengesellschaft, Leverkusen, Germany

[21] Appl. No.: 09/205,672

[22] Filed: Dec. 4, 1998

[51] Int. Cl.$^7$ .................................................. C01B 17/90
[52] U.S. Cl. ......................... 423/522; 423/523; 423/526; 423/528; 423/529; 423/531
[58] Field of Search .................................... 423/522, 523, 423/526, 528, 529, 531

[56] References Cited

U.S. PATENT DOCUMENTS

| | | | |
|---|---|---|---|
| 3,856,673 | 12/1974 | De La Mater et al. | 210/63 |
| 3,972,987 | 8/1976 | von Plessen et al. | 423/523 |
| 4,257,986 | 3/1981 | Milligan et al. | 568/934 |
| 4,663,490 | 5/1987 | Gerken et al. | 568/934 |
| 5,275,701 | 1/1994 | Mazzafro et al. | 203/12 |

FOREIGN PATENT DOCUMENTS

| | | | |
|---|---|---|---|
| 547600 | 1/1942 | United Kingdom | 423/528 |

OTHER PUBLICATIONS

Winnacker, Kuchler, *Chem. Technol.*, vol. 2, Anorg. Technol. 1, 4th edition, (month unavailable) 1982 pp. 70–72.

Kirk–Othmer, *Encycl. Chem. Techn.* 3rd edition, (month unavailable) 1982, pp. 928–929.

Bodenbenner, Von Plessen, Vollmuller, *Dechema–Monogr.* 86, (month unavailable) 1989, pp. 197–219.

*Primary Examiner*—Steven P. Griffin
*Assistant Examiner*—Timothy C Vanoy
*Attorney, Agent, or Firm*—Joseph C. Gil; Lyndanne M. Whalen

[57] ABSTRACT

A process is provided for the purification of sulfuric acid contaminated with impurities, such as nitric acid, nitrosylsulfuric acid, dinitrotoluenes and mononitrotoluenes, wherein this contaminated sulfuric acid was obtained from the production of nitrated toluene using toluene and nitric acid. The contaminated sulfuric acid is preheated to a temperature in the range of 50 to 180° C. in a heat exchanger. The heated, contaminated sulfuric acid is freed from steam-volatile impurities, such as dinitrotoluenes and mononitrotoluenes, and the nitrogen-containing compounds within the sulfuric acid are decomposed by counter currently contacting the contaminated sulfuric acid with steam and vapors from a downstream concentration step in a steam stripper, which is operated at a pressure ranging from 300 to 1,000 mbars. The steam-stripped sulfuric acid is fed into a first concentration stage, which is operated at the same pressure used in the steam stripper. The concentrated sulfur acid is then fed into a vacuum concentration process which produces a sulfuric acid having a concentration of 88 to 97 percent by weight. By using the same pressure that the steam stripper operates at in the first concentration stage, the crystallization of nitroaromatic compounds can be avoided in the condensation system of the concentration stages, along with the concomitant blockage of the condensation system that would have been caused by the crystals.

16 Claims, No Drawings

PROCESS FOR PURIFYING AND CONCENTRATING SPENT SULFURIC ACIDS

The present invention relates to a process for purifying and concentrating spent sulphuric acids, and in particular those obtained in processes for nitrating hydrocarbons with nitric acid in the presence of sulphuric acid, wherein the spent sulphuric acid is concentrated in several stages in vacuo and the steam-volatile organic compounds are separated off completely with steam in a purification stage coupled with the first concentration stage.

The disposal or recycling of spent sulphuric acids obtained in the manufacture of nitration products represents an economic problem, since sulphuric acid is responsible for a considerable share of the manufacturing costs of the products of the process. As a result attempts have been made on the one hand been made to avoid the use of sulphuric acid altogether (cf. Kirk-Othmer, Encycl. Chem. Techn. 3rd Edition, 1981, Vol. 15, pp. 928–929) and on the other hand, by using more or less highly complicated purification processes (U.S. Pat. No. 4,257,986), to make the sulphuric acid usable in the fertilizer industry or for recycling, after prior concentration.

The most widely used process for the concentration of spent sulphuric acid is the so-called Pauling process [Bodenbrenner, von Plessen, Vollmüller, Dechema-Monogr. 86 (1989), 197], in which a relatively pure 96% sulphuric acid can be recovered.

The disadvantages of this process are the high specific investment and operating costs and the formation of $SO_2$ and $NO_x$ compounds and gases due to the oxidative decomposition of some of the organic compounds.

According to U.S. Pat. No. 3,856,673 the organic compounds can be removed substantially but not completely from the sulphuric-acid-containing waste acid by stripping with steam at temperatures from 130 to 230° C.

Where untreated spent sulphuric acid (hereinafter referred to as waste acid), and in particular acid obtained in the production of dinitrotoluene, is to be concentrated the processes known per se for the concentration of sulphuric acid by evaporation in vacuo [Winnacker, Küchler, Chem. Technol, Vol. 2, Anorg.Technol. I, 4th Edition, 1982, pp. 70–72] present a number of problems which have prevented them from being used. If the nitration process is carried out under optimum conditions the waste acids contain not only water but also in particular nitrosylsulphuric acid and, in the nitration of toluene, dinitrotoluenes (DNT), mononitrotoluenes (MNT) and nitric acid.

Most of the nitrated organic compounds, such as DNT and MNT, are steam-volatile and are almost completely removed by evaporation together with the water. Due to the low condensation temperatures which are necessary under vacuum conditions nitroaromatic compounds, such as for example DNT, crystallize out as a result of their melting points and solubilities in water and lead to blockages in the condensation system. The direct condensation of the vapours in injection condensers using fresh cooling water is on the other hand not economically feasible since excessively high quantities of polluted effluent are obtained and the nitroaromatic compounds contained in the waste acid, such as for example MNT and DNT, cannot be recovered. If an indirectly cooled vapour condensate loop is however maintained, similar problems occur as in vapour condensation on cooled heat exchanger surfaces, due to the crystallization of nitroaromatic compounds such as for example DNT.

It has so far not been technologically possible to avoid these problems. Thus, according to EP-A 0 155 586, in order to avoid crystallization in the production of nitroaromatic compounds, preferably nitrotoluenes, during the condensation of the sulphuric acid vapours, mononitrotoluene (MNT) or MNT condensate mixtures are added in the concentration process.

The present invention is based on the problem of avoiding necessary after-treatments (e.g. using solvents or chemical additives) by the complete removal of the steam-volatile organic compounds and the simultaneous decomposition of nitrogen-containing secondary compounds in the purification and concentration of spent sulphuric acids. The process is also intended to provide economic and ecological improvements compared with known process conditions.

It has surprisingly been found that the abovementioned problems can be avoided if, after purifying the preheated waste acid with steam and vapours from the first concentration stage, it is introduced into a first concentration stage which is carried out under the same pressure as the purification stage (preferably in a stripping column).

The present invention relates to a process for purifiying and concentrating spent contaminated sulphuric acids obtained in the nitration of aromatic hydrocarbons in the presence of sulphuric acids, wherein the steam-volatile impurities are completely removed from the sulphuric acid and the nitrogen-containing compounds are decomposed in one purification stage and the sulphuric acid thus purified is concentrated, characterized in that a) the spent contaminated sulphuric acid is optionally preheated by means of heat exchange, b) the sulphuric acid is freed from steam-volatile impurities by treating it countercurrently with steam and vapours from the first concentration stage in a ratio of 10:90 to 90:10, under pressures between 200 and 1,000 mbar, preferably 300 to 500 mbar, c) the sulphuric acid from b) is introduced into a first concentration stage in which it is concentrated under the same pressure as in b) with the indirect introduction of heat, d) the sulphuric acid from c) is subjected to a single- or multi-stage vacuum concentration process in which the pressure is lower than that used in c) and the sulphuric acid is concentrated to 88 to 97% by weight, preferably 92 to 96% by weight.

One advantage of the process according to the invention is, inter alia, the fact that no mononitrotoluene has to be added to the superheated vapours of the vacuum evaporators of the concentration unit, as described in U.S. Pat. No. 4,663,490.

The process according to the invention is preferably used for the production of dinitrotoluene by the two-stage reaction of toluene with nitric acid in the presence of sulphuric acid, wherein in the first stage toluene is nitrated to form mononitrotoluene (MNT) using waste acids from the second stage, in which mononitrotoluene is nitrated to form dinitrotoluene (DNT) using concentrated waste acid from the first stage.

The aromatic hydrocarbon used is preferably toluene.

Preferably the spent contaminated sulphuric acid is preheated prior to purification by means of heat exchange, and more preferably by means of indirect heat exchange.

The spent contaminated sulphuric acid is preferably preheated to 50 to 180° C., more preferably to 100 to 150° C., and most preferably to 110 to 130° C.

The contaminated sulphuric acid is preferably preheated with steam, condensate from the evaporators, vapours from the concentration stages or the concentrated hot sulphuric acid from the vacuum concentration process or combinations thereof.

The temperature of the vapours from the first concentration process in stage b) is preferably no higher than 190° C., and more preferably 120 to 180° C.

In step b) the steam is preferably added in a quantity of 10 to 30% by weight, more preferably 12 to 17% by weight, based on the quantity of acid introduced, and under a pressure of 2 to 20 bars, preferably 3 to 10 bars.

The concentration of the sulphuric acid after the first concentration step is either equal to or higher than the concentration of the sulphuric acid prior to its introduction into the purification stage (preferably in a stripping column) or higher than the concentration of the sulphuric acid issuing from the purification stage (preferably in a stripping column).

A stripping column with 5 to 30, more preferably 9 to 15, theoretical trays (separating stages) is preferably used for the purification stage.

The vacuum concentration process is preferably carried out as described in Winnacker, Küchler, Chem. Technol., Vol. 2, Anorg. Technol. I, 4th Edition, 1982, pp. 70–72 or U.S. Pat. No. 5,275,701. The evaporators are particularly preferably installed horizontally or vertically.

A further advantage of the process according to the invention is the fact that, for example in the dinitration of toluene, the so-called waste acids from the first stage are preheated, purified via a stripping column and introduced into a first concentration process, from which the acid can then be introduced into one or more vacuum evaporators which can be arranged in parallel or in succession.

It is particularly advantageous for the first concentration stage to be carried out in combination with a stripping process under a slight vacuum so that the condensation takes place at temperatures higher than the freezing point of steam-volatile nitrated compounds (such as for example dinitrotoluene).

In the following the process according to the invention is explained in more detail with reference to the production of dinitrotoluene and the working up of the sulphuric acid obtained. The concentration data are merely mentioned by way of example; the invention is not limited by the data mentioned.

The aromatic hydrocarbon to be nitrated is introduced into the nitration stage. Fresh nitric acid (50 to 99% by weight) and sulphuric acid (88 to 99% by weight) are added to the nitration process in a controlled manner so that dilute (65 to 82% by weight) sulphuric acid can be subjected to working up after the nitration products have been almost completely removed.

The sulphuric acid contaminated with organic compounds and nitrogen compounds is preheated. This preheating can take place in heat exchangers to which live steam from the condensates formed or hot, discharged concentrated sulphuric acid is applied, preferably countercurrently. The preheated sulphuric acid is introduced into the upper section of a stripping column connected to the first concentration stage. The complete stripping of the steam-volatile organic compounds and decomposition of the nitrogen-containing compounds is carried out by means of directly introduced steam, and preferably with spontaneously produced steam of a pressure of 2 to 7 bars and the vapours of the first concentration stage. The pressure in the stripping column and in the evaporator is preferably 300 to 500 mbar in an industrially economic process.

The denitrified sulphuric acid, the concentration of which has been increased by up to 5% by weight and which has been completely freed from steam-volatile organic compounds, passes from the first concentration stage into the subsequent concentration stage(s), which are adequately described in the prior art (Winnacker, Küchler, Chem. Technol., Vol. 2, Anorg. Technolog. I, 4th Edition, 1982, pp. 70–72). In the condensers of the subsequent concentration stages no blockages occur in the condensation sections of the sulphuric acid concentration units even at a vacuum of 20 to 80 mbar, so that no chemicals have to be added. The condensers are preferably operated using cooling water of a temperature of up to approx. 10° C. The condensates are introduced directly into the effluent without any further extraction.

The process according to the invention is illustrated by means of the following example, without being limited thereby.

EXAMPLE 77.9% strength by weight sulphuric acid from the mononitration of toluene contained 0.03% by weight of $HNO_3$, 2.6% by weight of nitrosylsulphuric acid, 0.05% by weight of MNT and 1.4% by weight of DNT. 1,640 kg/h of this waste acid were preheated in heat exchangers to 130° C. and introduced into the upper section of a column at 300 mbar. The column filled with a packing had 12 theoretical separating stages and was connected directly to the first concentration evaporator. This evaporator was equipped with a tantalum tube bundle and was operated at 170° C. and 300 mbar with saturated steam of a temperature of 195° C. The vapours and 2.75 kg/h of saturated steam were passed through the column. The purified sulphuric acid, which was concentrated to 80.3% by weight, contained 0.08% by weight of nitrosylsulphuric acid and 0.01% by weight of MNT; no DNT or $HNO_3$ was detected.

The vacuum of 300 mbar was maintained by means of a liquid-piston pump. The purified sulphuric acid was concentrated to 92% by weight in a conventional vacuum evaporator unit. Washing out was not necessary.

What is claimed is:

1. A process for purifying and concentrating spent contaminated sulfuric acids obtained in the nitration of aromatic hydrocarbons in the presence of sulfuric acids comprising
    a) optionally, preheating by heat exchange the spent, contaminated sulfuric acid,
    b) treating the spent, contaminated sulfuric acid countercurrently with steam and vapors from a concentration stage in a sulfuric:acid steam and vapors ratio of 10:90 to 90:10 at a pressure between 200 and 1,000 mbar to free it from steam-volatile impurities and decompose any nitrogen-containing compounds present,
    c) introducing the sulfuric acid from step b) into a first concentration stage in which it is concentrated at the same pressure as that used in step b) by indirect introduction of heat, and
    d) introducing the sulfuric acid from step c) into a vacuum concentrator in which the pressure is lower than that used in step c) and the sulfuric acid is concentrated to 88 to 97% by weight.

2. The process according to claim 1 in which the spent contaminated sulfuric acid is preheated by heat exchange in step a).

3. The process according to claim 2 in which the heat exchange of step a) is carried out indirectly.

4. The process according to claim 2 in which the spent contaminated sulfuric acid is preheated to 50 to 180° C. in step a).

5. The process according to claim 2 in which the preheating in step a) is carried out using either steam, condensate from evaporators, vapors from step c), vapors from step d), the concentrated hot sulfuric acid from step d) or a combination thereof.

6. The process according to claim 1 in which the temperature of the vapors used in step b) is no higher than 190° C.

7. The process according to claim 1 in which the steam is added in step b) in a quantity of 10 to 30% by weight, based on the quantity of acid, and under a pressure of 2 to 20 bars.

8. The process according to claim 1 in which step b) is carried out in a stripping column having 5 to 30 theoretical separating stages.

9. The process of claim 1 in which the sulfuric acid is concentrated to from 92 to 96% by weight in step d).

10. The process of claim 1 in which step b) is carried out at a pressure of from 300 to 500 mbar.

11. The process of claim 2 in which the spent, contaminated sulfuric acid is preheated to 100 to 150° C. in step a).

12. The process of claim 3 in which the spent, contaminated sulfuric acid is preheated to 50 to 180° C. in step a).

13. The process of claim 1 in which the temperature of the vapors used in step b) is from 120 to 180° C.

14. The process of claim 1 in which the steam added in step b) is added in a quantity of from 12 to 17% by weight, based on the quantity of acid.

15. The process of claim 1 in which the steam is added in step b) under a pressure of from 3 to 10 bars.

16. The process of claim 1 in which step b) is carried out in a stripping column having from 9 to 15 theoretical separating stages.

* * * * *